United States Patent [19]
Downs

[11] Patent Number: 6,054,778
[45] Date of Patent: Apr. 25, 2000

[54] ELECTRONIC STEERING WHEEL TECHNIQUE FOR PASSING INFORMATION WITH A PROGRAMMABLE CURRENT SOURCE AND DETECTOR

[75] Inventor: Stuart G. Downs, San Diego, Calif.

[73] Assignee: TRW Inc., Redondo Beach, Calif.

[21] Appl. No.: 09/228,588

[22] Filed: Jan. 12, 1999

[51] Int. Cl.[7] .................................................. H04L 12/10
[52] U.S. Cl. .............................. 307/10.1; 307/38; 307/60; 701/36; 701/53
[58] Field of Search ................................ 307/10.1, 38, 60, 307/52; 340/825.57, 825.72; 320/82; 327/108; 361/70; 363/73; 701/53, 36

[56] References Cited

U.S. PATENT DOCUMENTS

| | | | |
|---|---|---|---|
| 4,628,310 | 12/1986 | Reighard et al. | 340/825.72 |
| 5,289,043 | 2/1994 | Marshall et al. | 307/10.1 |
| 5,762,159 | 6/1998 | Matsuoka et al. | 180/422 |
| 5,878,082 | 3/1999 | Kishigami | 307/60 |

OTHER PUBLICATIONS

Co–pending U.S. Patent Application (Attorney Docket No. 20–0078) 09/228,591 (701/36).

*Primary Examiner*—Albert W. Paladini
*Attorney, Agent, or Firm*—Michael S. Yatsko

[57] ABSTRACT

A steering wheel control system (10) that employs a method for passing push-button commands from a steering wheel to a vehicle system, wherein the method is not dependant upon the contact resistance of a sliding contact (32) located in the steering wheel column. The control system (10) includes a constant current source circuit (20) that generates a unique constant current corresponding to each command. The sliding contact (32) passes the constant current between the steering wheel and the vehicle system, and a calibrated resistance circuit (40) converts the unique constant current into a discrete voltage. The discrete voltage is also converted into a digital signal for use by a microcontroller (60) to activate the vehicle systems. The use of constant currents therefore avoids operational problems associated with decreases in the overall system noise margin due to large voltage drops across the sliding contact (32). Furthermore, the use of off-the-shelf constant current generation and conversion components allows for an overall reduction in system cost and increase in system reliability.

20 Claims, 1 Drawing Sheet

ELECTRONIC STEERING WHEEL TECHNIQUE FOR PASSING INFORMATION WITH A PROGRAMMABLE CURRENT SOURCE AND DETECTOR

CROSS-REFERENCE TO RELATED APPLICATION

This application is related to one commonly assigned application entitled: "Touchtone Electronic Steering Wheel", TRW Docket No. 20-0078, Ser. No. 09/228,591, having inventor Stuart G. Downs; filed on the same date as this application. This application is incorporated herein by reference in its entirety.

BACKGROUND OF THE INVENTION

1. Field of the Invention

The present invention relates generally to vehicle steering wheels. More particularly, the present invention relates to an improved technique for passing electronic information between a steering wheel electronics assembly and a vehicle system that employs a programmable current source.

2. Discussion of the Related Art

In the automotive industry, steering wheels commonly provide drivers with a number of automotive controls such as cruise control, braking, flashing front lights, and flashing rear lights that are operated by electronic push buttons located on the steering wheel. These push buttons generate electronic information to be used by the vehicle when performing the various automotive functions. Existing techniques pass the electronic information from a steering wheel electronics assembly to an electronic control box, located under the dashboard or elsewhere in the vehicle. The steering wheel electronics assembly is generally located in the center of the steering wheel and can have the various electronic push buttons and lights mounted on it to operate the vehicle systems. The rotary motion of the steering wheel in relation to the steering wheel column typically requires the placement of one or more sliding contacts in the column in order to pass the electronic information from the steering wheel to the electronic control box. Typically, the steering wheel electronics assembly uses a time bit sequence of information and signal magnitude to convey to the electronic control box which particular button was pushed. In turn, the electronic control box decodes the electronic information and activates the appropriate automotive circuit within the vehicle. This circuit technique is fairly complex and difficult to maintain particularly due to the bit sequencing algorithms and circuitry required.

Another significant problem with this circuit technique for transmitting signals from steering wheel to a vehicle system concerns the contact resistance of the sliding contacts. The sliding elements of the sliding contacts are typically spring loaded and very prone to oxidation and other causes of surface degradation. If the electrical resistance between the sliding elements of a contact is too large, there will be an increased voltage drop across the sliding elements which decreases the overall system noise margin. The result is that the electronic control box cannot interpret the signal magnitude, and the system will either fail to operate or operate intermittently. This failure to operate properly is a source of great frustration to the driver, reduces system reliability, and causes numerous and costly repairs. Thus, there is a need to combat the problem created by high contact resistance of sliding contacts without increasing the cost of overall system operation.

SUMMARY OF THE INVENTION

The steering wheel control system of the present invention passes electronic information between a steering wheel push-button and a vehicle system by generating a constant current corresponding to the electronic information, passing the constant current from the steering wheel through a sliding contact and converting the constant current into a discrete voltage that is used by a microcontroller for identification of the electronic information.

The present invention therefore identifies the electronic information by a current level rather than a voltage level, which minimizes the effect of large voltage drops across the sliding contact. A particular current corresponds to each steering wheel push-button rather than a sequence of signal magnitudes. An electronic control box can then simply look for the presence of particular current levels rather than the typical time bit sequence of information at a minimum required magnitude. The present invention also uses a much simpler circuit than in existing technologies because of the off-the-shelf nature of constant current generation and current conversion components. This simplicity makes the present invention less expensive and easier to maintain. Furthermore, the present invention allows for the continued use of current sliding contacts.

Further objects, features and advantages of the invention will become apparent from a consideration of the following description and the appended claims when taken in connection with the accompanying drawings.

DETAILED DESCRIPTION OF THE PREFERRED EMBODIMENTS

The following discussion directed to an electronic steering wheel technique for passing information with a programmable current source and detector is merely exemplary in nature, and is in no way intended to limit the invention or its applications or uses.

Figure 1:
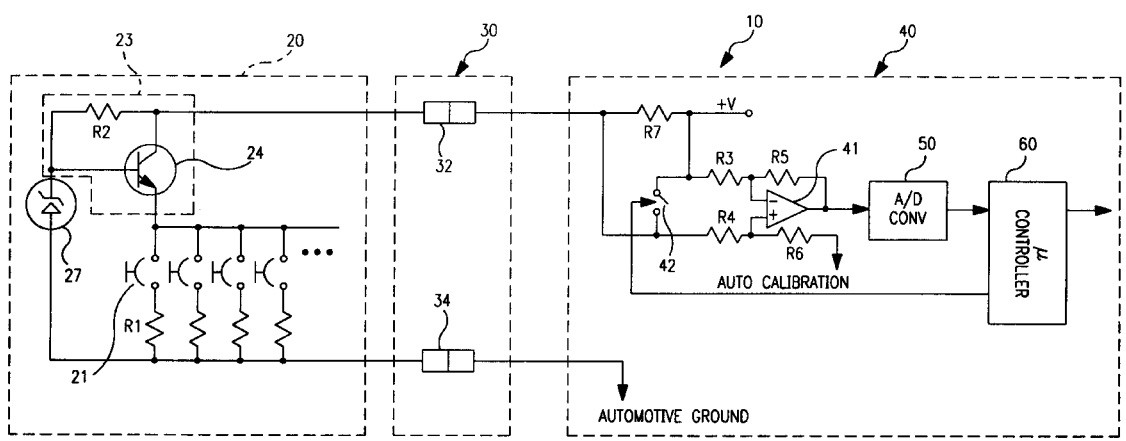
FIG. 1 is a circuit diagram of a steering wheel control mechanism in accordance with an embodiment of the present invention.
Figure 2:
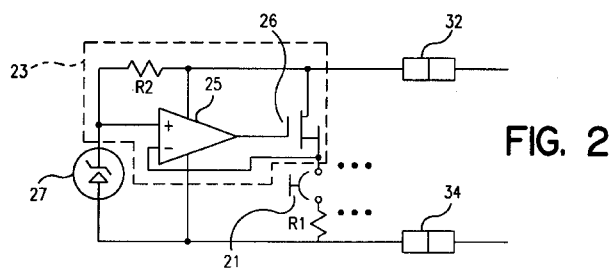
FIG. 2 is a circuit diagram of a constant current source circuit in accordance with an alternate embodiment of the present invention.

Turning now to FIGS. 1 and 2, a steering wheel control system, indicated generally at 10, according to the invention, includes a constant current source circuit 20, a signal transmission assembly 30, and a calibrated resistance circuit 40 for passing electronic information from a steering wheel push-button (not shown) to a vehicle system (not shown). The steering wheel push-buttons are used to operate various vehicle systems, such as the vehicle cruise control system, emergency flashers, etc. The constant current source circuit 20 includes a plurality of contact switches 21 and programming resistors R1 for each separate push-button on the steering wheel, where each programming resistor R1 has a different value. The particular value of the resistor R1 associated with each contact switch 21 allows the constant current source 20 to generate a different constant current depending on which steering wheel push-button is pressed. In other words, each switch on the vehicle's steering wheel is assigned a particular current level, so that when a steering wheel push button is activated, the associated contact switch 21 is closed, and the value of the resistor R1 associated with that contact switch 21 determines the current level.

The constant current circuit 20 further includes a constant current mechanism 23 that generates the constant current based on which contact switch 21 is pressed, and a precision band-gap reference diode 27 that provides a reference voltage for the current mechanism 23. The constant current mechanism 23 includes a biasing resistor R2 and a bipolar junction transistor (BJT) 24. Alternately, the current mechanism 23 includes a field-effect transistor (FET) 26 and a programming operational amplifier 25, as shown in FIG. 2. If the constant current mechanism 23 includes the BJT 24, then the biasing resistor R2 properly biases the BJT 24. If the constant current mechanism 23 includes the FET 26 and the programming operational amplifier 25, then the programming operational amplifier 25 biases the FET 26 while the biasing resistor R2 biases the programming operational amplifier 25. It should be noted that use of the programmable operational amplifier 25 at a low power eliminates the base-emitter voltage drift in the BJT 24, and allows programmable currents to be much higher than required for circuit operation.

The signal transmission assembly 30 includes a first sliding contact 32 that transfers the current signal from the constant current source circuit 20 to the calibrated resistant circuit 40. Additionally, the signal transmission assembly 30 includes a second sliding contact 34 that connects the source circuit 20 to an electrical ground. The source circuit 20 would be located in the vehicle steering column, and the sliding contacts 32 and 34 would allow the electrical signal to be transferred from the vehicle steering column to a non-rotating electrical connection.

The calibrated resistance circuit 40 includes a plurality of differential resistors R3 through R7 and a differential operational amplifier 41. The resistor R7 receives the current signal through the sliding contact 32, and provides a voltage drop depending on that current level. The resistors R3–R6 act as a voltage divider for the operational amplifier 41 that receives the voltage signal from the resistor R7. Therefore, the output of the amplifier 41 is an analog voltage output representative of the voltage drop across the resistor R7 for each particular current level. The circuit 40 also includes an analog-to-digital (A/D) converter 50 and a microcontroller 60. The A/D converter 50 receives the analog signal from the operational amplifier 41 and converts it to a digital signal, and the microcontroller 60 receives the digital signal and transmits it to the corresponding vehicle system through a relay (not shown) to operate that vehicle system depending on the digital value of the particular current level. The microcontroller 60 has an auto calibration output which is connected to a calibration switch 42 to calibrate the voltage divider.

In operation, the steering wheel control system 10 has an ambient current on the order of a few milliamps in its non-activated state before the driver activates a push button on the steering wheel. When a push button is activated, the corresponding contact switch 21 closes and the control system 10 passes electronic information from the steering wheel to the selected vehicle system. The constant current source 20 generates a constant current corresponding to the electronic information based on the value of the resistor R1 associated with the particular switch 21. The programming resistor R1 thus generates a programmable current corresponding to the electronic information when the contact switch 21 closes. The constant current mechanism 23 then generates the constant current in response to the programmable current and the precision band-gap reference 27 provides a reference voltage to the constant current mechanism 23. Therefore, depending on which contact switch 21 is closed, the constant current mechanism 23 generates a different constant current. The sliding contact 32 then passes the constant current from the steering wheel to the calibrated resistance circuit 40 that converts the constant current into a discrete voltage.

The voltage divider provided by the differential resistors R3 through R6 creates a unique differential voltage based on the constant current flowing through resistor R7. Specifically, the resistor R7 drops a certain amount of voltage across it, while resistors R3 through R6 operate as a voltage divider for the differential operational amplifier 41. The differential operational amplifier 41 then creates a discrete voltage based on the differential voltage. The A/D converter 50 converts the discrete voltage into a digital signal, and the microcontroller 60 processes the digital signal. The microcontroller 60 also has the auto calibration output which calibrates the calibrated resistance circuit 40 in response to resistance changes by triggering the calibration switch 42 located in the calibrated resistance circuit 40.

It should be appreciated that due to the use of a constant current to pass the electronic information, the control system 10 can operate effectively at contact resistances as high as approximately 50 ohms whereas existing methods encounter transmission problems above approximately 1 to 10 ohms.

It is to be understood that the invention is not limited to the exact construction illustrated and described above, but that various changes and modifications may be made without departing from the spirit and scope of the invention as defined in the following claims.

What is claimed is:

1. A method for passing electronic information between a steering wheel and a vehicle system, said method comprising the steps of:

generating a constant current corresponding to the electric information;

passing the constant current between the steering wheel and the vehicle system; and converting the constant current into a discrete voltage.

2. The method of claim 1 wherein the generating step comprises the steps of:

generating a programmable current corresponding to the electronic information from a plurality of available currents; and generating the constant current in response to the programmable current.

3. The method of claim 1 wherein the converting step comprises the steps of:

creating a differential voltage based on the constant current; and creating the discrete voltage based on the differential voltage.

4. The method of claim 3 further comprising the step of converting the discrete voltage into a digital signal.

5. The method of claim 4 further comprising the step of recognizing the electronic information based on the digital signal.

6. The method of claim 5 further comprising the step of calibrating for resistance changes.

7. A steering wheel control system for passing electronic information from a steering wheel to a vehicle system, said control system comprising:

a constant current source circuit for generating a constant current corresponding to the electronic information;

a sliding contact for passing the constant current from the steering wheel; and a calibrated resistance circuit for converting the constant current into a discrete voltage.

8. The steering wheel control system of claim 7 wherein the constant current source circuit comprises:

a plurality of contact switches;

a plurality of programming resistors for generating a programmable current corresponding to the electronic information when a contact switch is closed;

a constant current mechanism for generating the constant current in response to the programmable current; and a precision band-gap reference device for providing a reference voltage to the constant current mechanism.

9. The steering wheel control system of claim 8 wherein the constant current mechanism comprises:

a bipolar junction transistor; and a biasing resistor for properly biasing the bipolar junction transistor.

10. The steering wheel control system of claim 8 wherein the constant current mechanism comprises:

a field-effect transistor;

a programming operational amplifier for properly biasing the field-effect transistor to generate the constant current; and a biasing resistor for properly biasing the programming operational amplifier.

11. The steering wheel control system of claim 7 wherein the sliding contact has a contact resistance in the range of approximately 10 to 50 ohms.

12. The steering wheel control system of claim 7 wherein the calibrated resistance circuit comprises:

a plurality of differential resistors for creating a differential voltage based on the constant current; and a differential operational amplifier for creating the discrete voltage based on the differential voltage.

13. The steering wheel control system of claim 7 further comprising an analog-to-digital converter for converting the discrete voltage into a digital signal.

14. The steering wheel control system of claim 13 further comprising a microcontroller for recognizing the electronic information based on the digital signal.

15. The steering wheel control system of claim 14 wherein the microcontroller further comprises an auto calibration output for calibrating the calibrated resistance circuit.

16. The steering wheel control system of claim 15 wherein the calibrated resistance circuit further comprises a calibration switch for receiving the auto calibration output from the microcontroller.

17. A steering wheel control system for passing an electrical signal from a plurality of steering wheel switches to a corresponding vehicle system, said control system comprising:

a constant current source circuit for generating a constant current corresponding to a selected steering wheel switch, said constant current source circuit including a plurality of contact switches and a plurality of programmable resistors having different resistive values, wherein a different contact switch is connected to each steering wheel switch and a different programmable resistor is connected to each contact switch so that a unique programming resistor generates a programmable current in response to the contact switch that is closed in response to the selected steering wheel switch, said current source circuit further including a constant current mechanism for generating a unique constant current in response to the programmable current;

a sliding contact for passing the constant current from the steering wheel; and a calibrated resistance circuit for converting the constant current into a discreet voltage.

18. The steering wheel control system according to claim 17 wherein the calibrated resistance circuit includes a plurality of resistors forming a voltage divider, said voltage divider creating a differential voltage based on the constant current, and a differential operational amplifier responsive to the differential voltage and creating a discreet voltage based on the differential voltage.

19. The steering wheel control system according to claim 17 further comprising an autocalibration system for calibrating the calibrated resistance circuit, said autocalibration system including a calibration switch associated with the calibrated resistance circuit, said calibration switch being activated in response to calibration information from a controller that receives the differential voltage.

20. The steering wheel control system according to claim 17 wherein the sliding contact has a contact resistance in the range of approximately 10 to 50 ohms.

* * * * *